2,978,562
INSTANTANEOUS WATER HEATING SYSTEM
Hubert D. Fox, 310 Fairview Ave., Winnetka, Ill.

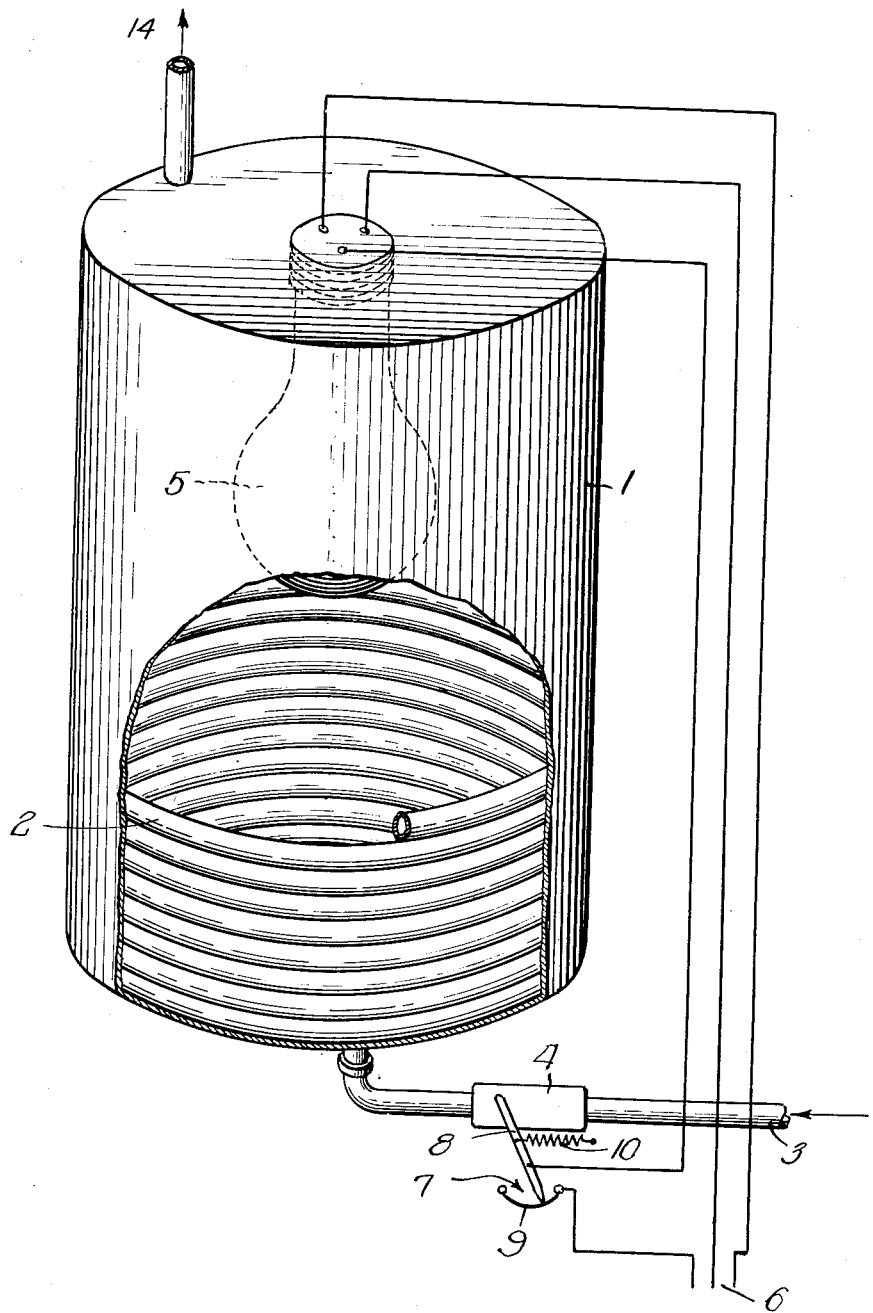

Filed May 19, 1958, Ser. No. 736,191

2 Claims. (Cl. 219—10.51)

My invention relates to a new method and apparatus of producing hot water in any type of hot water heating system, and is particularly advantageous where the usage is intermittent. This system utilizes the energy released by a magnetron tube to heat the water. The tube emits ultrasonic waves of 2450 megacycles, assigned Federal Communications Commission. Water flowing through the system absorbs the energy of the waves and offers a resistance which heats the water at a rapid rate.

By utilizing the rapid rate of heating, the invention provides water on a "heat as you use" principle, eliminating the necessity of any storage tank for a ready supply of hot water. The apparatus of my invention also maintains when desired a continuous flow of hot water at a constant temperature regardless of extent of usage.

The system is unique in three principal respects from present day water heating systems:

1st: The water is heated only as it is drawn into use.
2nd: No heat is wasted in maintaining a supply tank of hot water during non-use periods.
   Because of these two reasons the cost of operating the unit should be economical.
3rd: The system will never run out of hot water during periods of heavy usage as the water is constantly heated to the desired temperature as it flows through the system.

The above and other objects and advantages of the invention will appear in the following description thereof.

Referring now to the accompanying drawing forming part of this application, and wherein like reference characters indicate like parts, the figure is a perspective view partially broken away of a water heater comprising the invention.

Referring now in detail to the drawing, the apparatus consists of four main parts: an outer shell with a highly reflective inner surface; a series of non-reflective water coils such as low dielectric plastic tubing inside the shell; a magnetron tube located inside the coils, and a combined rheostat type control switch operated by a water supply valve, whereby the amount of electrical energy used is directly proportional to the rate of flow of water through the control valve.

The outer shell of the water heating apparatus is shown at 1, it being of aluminum or stainless steel and having a highly polished reflective inner surface. I have illustrated the shell as being cylindrical in form but, of course, this is not necessary. Within this shell and concentrically disposed therein adjacent the shell wall is a coil of non-reflective water pipe 2. The cold water supply is indicated at 3, which leads to and through a butterfly valve 4 to the lower end of coil 2 within the shell. At the upper end of the shell, the coil pipe emerges at 14 and is connected as is usual to the hot water pipes to faucets for use.

The length and size of the coil within the pipe, of course, is determined by the average quantity of hot water demanded of the unit. In other words, the coil pipe is large enough to permit the average quantity of water demand to pass therethrough. The length of the coil pipe is determined by the time required to raise the temperature of the water entering the unit at about atmospheric temperature to 140° or 150° when it emerges therefrom.

Centrally disposed axially within the coil is a magnetron tube 5. When the wave energy transmitted from such a tube comes in contact with a substance, such energy is either reflected, transmitted, or absorbed. When it is absorbed it is converted into heat, and in the absorption the molecules are disturbed under the influence of the waves, and the friction created thereby causes the heat. If there is no absorption there is no heating, and only the material which absorbs the wave energy becomes hot, and almost instantaneously so. The dielectric tubing does not absorb the energy, but transmits it to the water in the tube which does absorb the energy and consequently becomes hot, and almost instantaneously so. Any of the wave energy which passes between the convolutions of the coil engage the polished surface of the shell 1 and are reflected back to the coil and the water therein. The capacity of this tube is determined by the amount of electric energy required to produce sufficient waves to raise the temperature of a unit of water entering the coil at atmospheric temperature to 140° to 150° during the time it takes that unit of water to pass through the device. Tube 5 is connected to the source of current supply 6 through a rheostat 7. The pivotally mounted arm 8 moves along the resistance wire 9 of the rheostat and thereby varies the amount of electrical energy delivered to the tube 5. Arm 8 is also connected to the butterfly valve 4 so that when a faucet is opened the amount of water flowing in the supply line 3 will determine how far the valve 4 will open. This in turn will regulate movement of the arm 8 along the resistance of the rheostat and regulate accordingly the amount of electric energy to the tube. The wattage used by the tube is thus regulated by the flow of water.

A spring 10 is connected at one end to arm 8 and at the other end is fixed so that the arm 8 moves against the tension of the spring. Thus when the water is shut off the spring will return the valve to closed position and at the same time set the arm at the proper position on the rheostat when the system is at rest.

Arm 8, of course, would necessarily have to be insulated so that there would be no shorting of the current through the water line, and the spring is of the proper capacity to close the valve against the water pressure in the line.

I have diagrammatically illustrated and described the principles of construction and operation of my water heating system and it is understood that various changes within the scope of the following claims may be made without departing from the spirit of the invention. Furthermore, wherever the term "water" is used herein, it is intended that any material in fluid state may be similarly treated.

I claim:

1. Means for heating water as used comprising an enclosure having a reflective inner surface, a length of low dielectric plastic tubing within the enclosure and adjacent the walls thereof, a magnetron tube axially disposed within the enclosure, a source of electric energy to energize the tube, a source of water supply for the tubing, and means supplying electric energy to said tube upon flow of water in said tubing.

2. A fluid heater including an enclosure, a length of low dielectric tubing within the enclosure, a magnetron tube disposed within the enclosure adjacent the tubing, a source of electric energy for said tube, a source of fluid supply for said tubing, means varying the electric energy to the tube in proportion to the fluid supplied to the tubing, said means comprising a control valve in said tubing and a rheostat in said electric energy supply, said valve and said rheostat being interconnected.

References Cited in the file of this patent

UNITED STATES PATENTS

| | | |
|---|---|---|
| 1,526,683 | Seavey | Feb. 17, 1925 |
| 2,513,779 | Bailey | July 4, 1950 |
| 2,585,970 | Shaw | Feb. 19, 1952 |